Dec. 31, 1968 D. P. CORBY 3,419,147
APPARATUS FOR REMOVING GREASE FROM CANS AND DRUMS
Filed July 18, 1966 Sheet 1 of 3
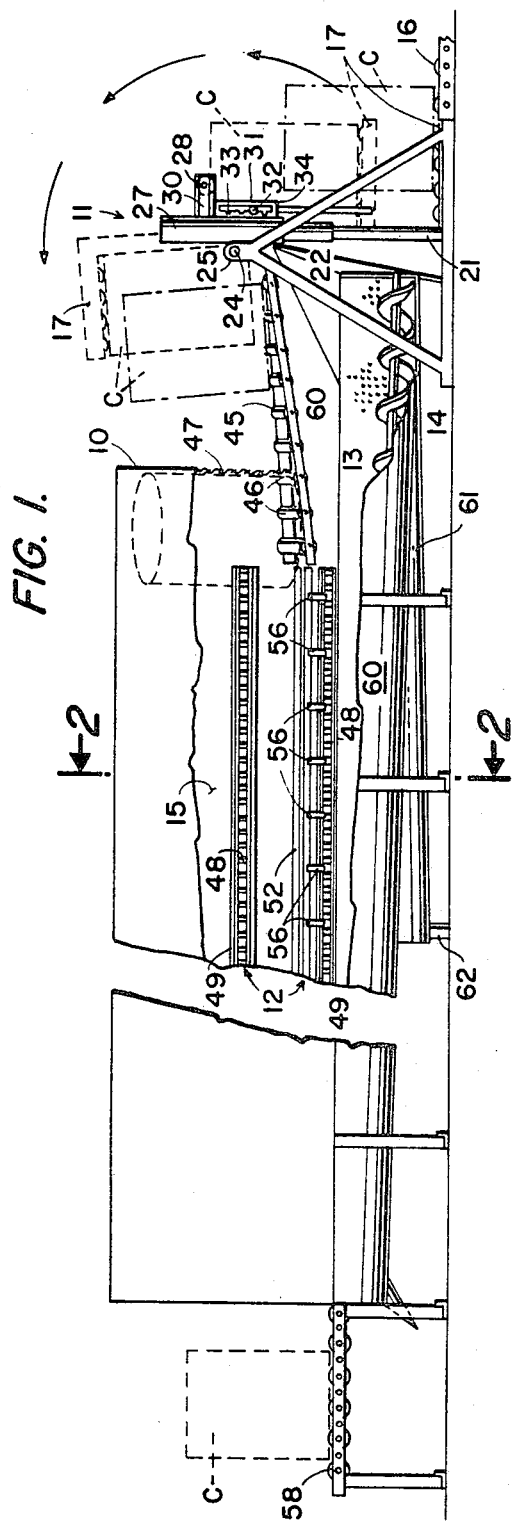
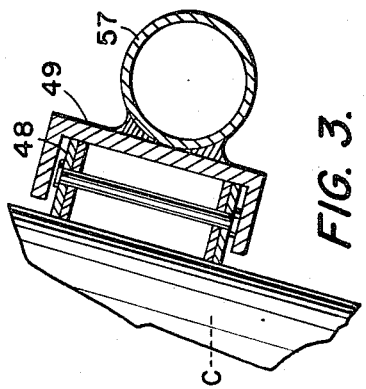
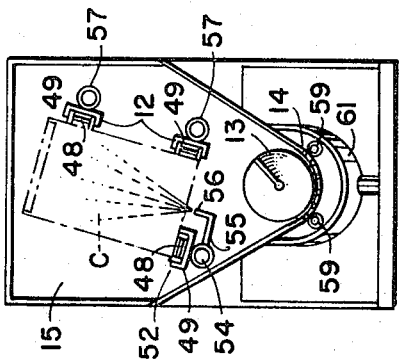
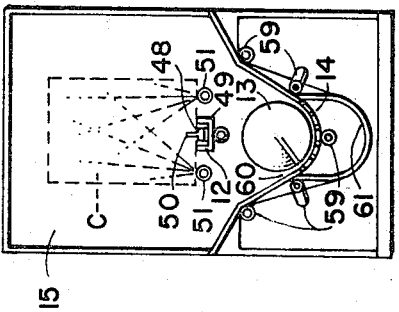
INVENTOR.
DENIS P. CORBY
BY
Hansen and Lane
HIS ATTORNEYS Dec. 31, 1968 D. P. CORBY 3,419,147
APPARATUS FOR REMOVING GREASE FROM CANS AND DRUMS
Filed July 18, 1966 Sheet 2 of 3

INVENTOR.
DENIS P. CORBY
BY
Hansen and Lane
HIS ATTORNEYS

United States Patent Office 3,419,147
Patented Dec. 31, 1968

3,419,147
APPARATUS FOR REMOVING GREASE FROM CANS AND DRUMS
Denis P. Corby, San Jose, Calif., assignor to Crown By-Products Co., San Jose, Calif., a corporation of California
Filed July 18, 1966, Ser. No. 566,156
8 Claims. (Cl. 210—152)

This invention relates to apparatus for removing grease from cans and drums. The cans and drums in question are containers of the type used by butchers and restaurants to hold and store scraps and bones trimmed from meat or to receive leftovers for disposal.

The problem entails cleaning the cans so that they are absolutely greaseless and free of any contamination or odors before replacing them in kitchens, butcher shops and other such establishments whence the scraps are collected.

The apparatus embodying the present invention is employed in disposal plants where such scraps are rendered for the byproducts they contain. Byproducts such as bone-meal, fertilizers, proteins useable in chicken and animal feed and fats utilized in soaps, greases and other products are salvaged.

The fats from the scraps stored and carried in these containers are usually compressed and congealed such as to cling to the inner walls of the cans. Consquently, although the major part of the scraps is removed by inversion of the cans much of it adheres to the inner walls. Heretofore hand scraping was required in order to remove all of the fats adhering to the can prior to steam cleaning of the cans with caustic solutions.

The present invention has as an object the provision of an apparatus for removing grease from cans. In connection with the grease removal aspect it is a further object to provide an apparatus for receiving full cans, inverting the cans, and unloading the scraps into a separator; removing the grease and ultimately cleaning the cans for reuse.

The apparatus of the present invention further provides a means for separating solids from liquids whereby grease, rendered into a flowable state, is drained off and captured while the solids such as meat and bones are separately discharged for cooking and rendering and ultimate dehydration and pulverization.

These and other objects and advantages of the present invention will become more apparent from a reading of the following description in the light of the three sheets of drawings in which:

FIG. 1 is a side elevation of the apparatus embodying the present invention, parts being broken away and the overall length foreshortened for purpose of illustration.

FIG. 2 is a section through FIG. 1 taken substantially along line 2—2 thereof.

FIG. 2A is a section similar to that of FIG. 2 showing another form of conveyor arrangement.

FIG. 3 is an enlarged detail of a portion of FIG. 2.

Figure 5:
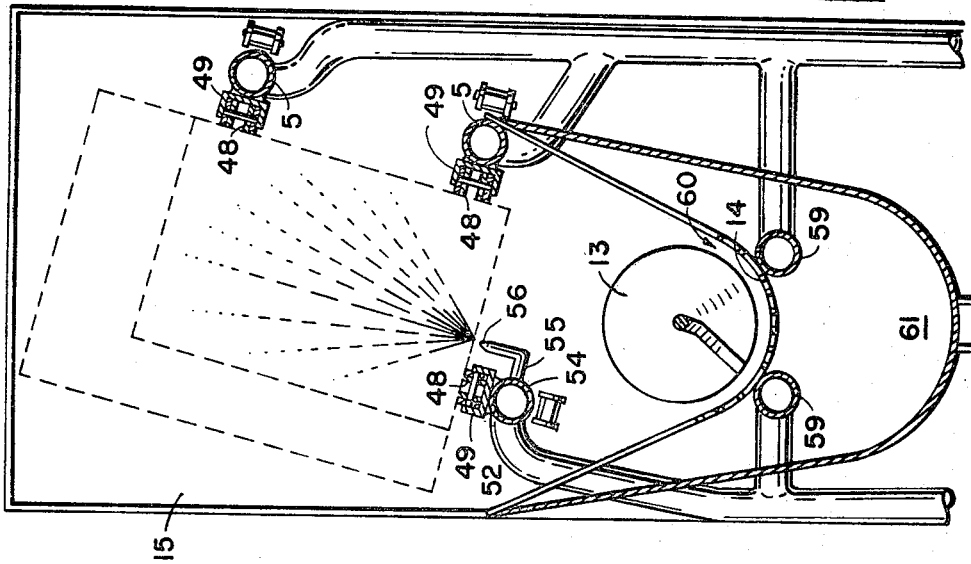
FIG. 5 is a section through FIG. 4 taken along line 5—5 thereof.

Briefly the apparatus 10 of the present invention includes a can dumper 11 by which cans are inverted and placed upon a conveyor 12, the contents falling through to a screw feed 13 while liquids and flowable greases drain off through a sieve or screen 14. The inverted cans are engaged, one at a time by flights on the conveyor for movement through a steam chamber 15 wherein jets of steam impinging upon the interior of the cans softens and removes all grease adhering thereto.

Can dumper

Figure 6:
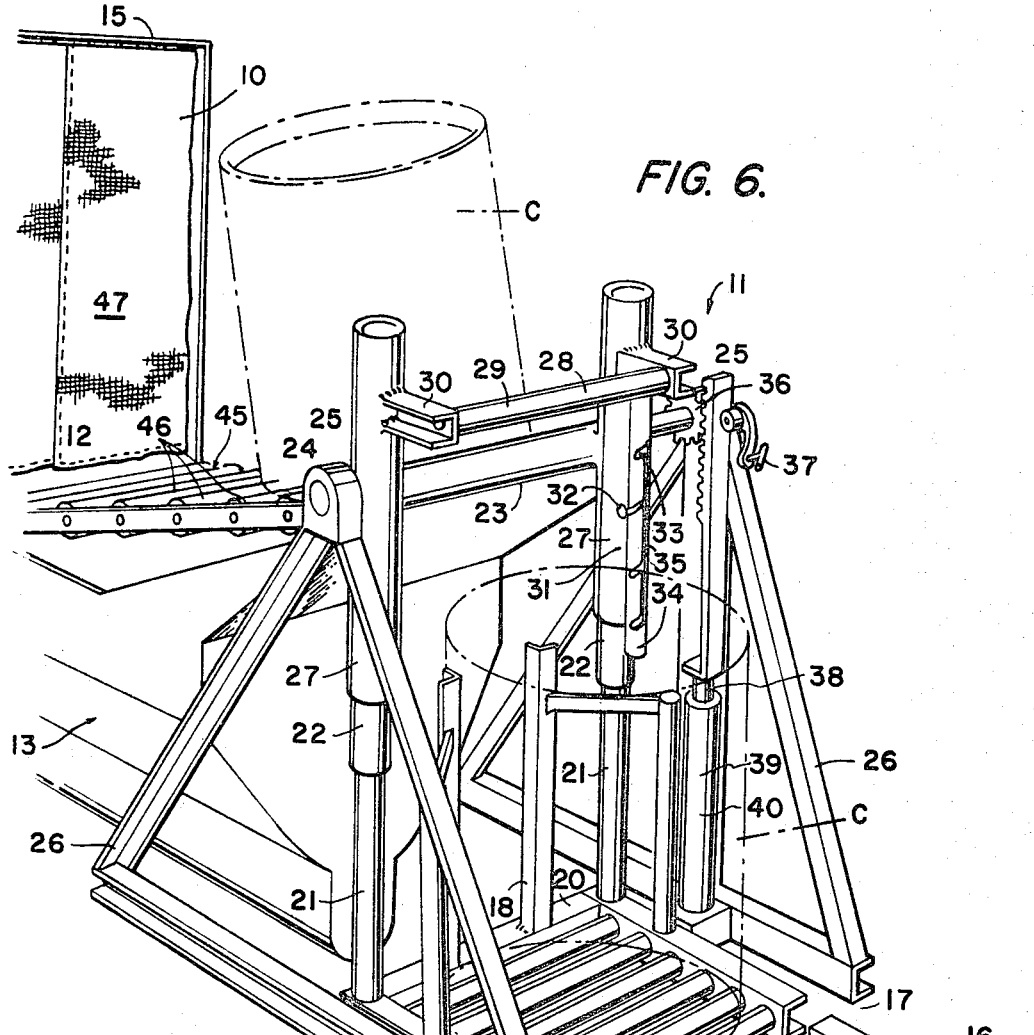
FIG. 6 is a perspective view of the can receiver and dumper at the right hand end of FIG. 1.
Figure 7:
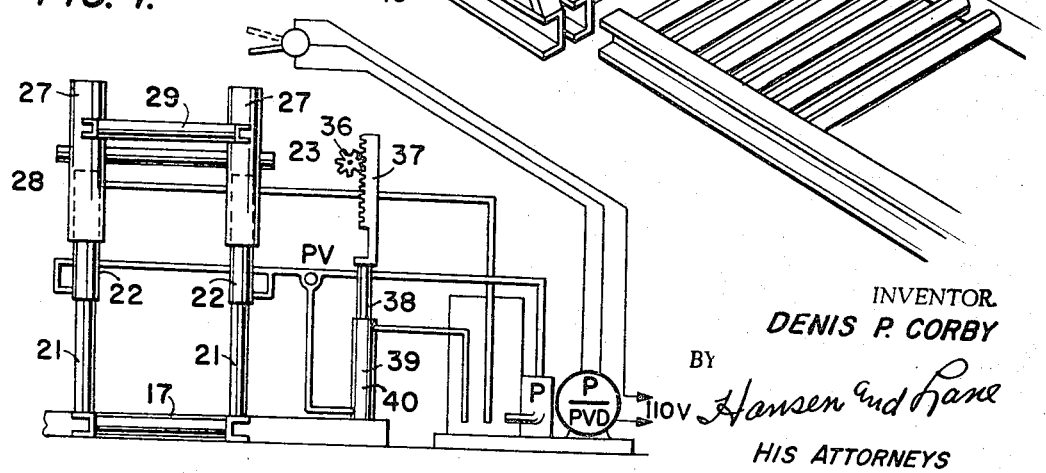
FIG. 7 is a schematic diagram of the hydraulic system for the can dumper and clamp.

Referring to FIGS. 1 and 6 the can dumper 11 is shown at the receiving end of the apparatus 10. Full cans C which are brought in by truck are placed on a roller conveyor 16 for easy movement from the truck onto a receiving platform 17 of the can dumper 11.

As best seen in FIG. 6 the platform 17 is a part of an L-shaped can clamp, elevator and inverter. The platform 17 includes a plurality of rollers 18 journalled on crossbars having their ends supported in the side arms 19 of a C-shaped frame 20. A pair of upright rods 21 secured to the respective corners of the frame 20 have pistons at their ends (not shown) arranged for up and down movement in cylinders 22 of hydraulic rams within which the rods 21 extend and have their pistons effected by hydraulic fluid.

The cylinders 22 are spaced from each other by a cross sleeve 23 mounted on a cross shaft 24 and keyed thereto for turning therewith. The ends of the cross shaft 24 are journaled in bearings 25 on upright standing legs 26 on each side of the path of movement of the cans.

Each cylinder 22 has a sleeve member 27 guided for up and down movement thereon, the distance of movement being determined by the height of the cans. These sleeve members 27 form part of a can clamp 28 which includes a crossbar 29 secured to brackets 30 extending rearwardly from the sleeve members to which they are secured. Suitable means 31 for raising and lowering the can clamping crossbar 29, just above the top rim of a can to be received, consists of a pin 32 carried by the hydraulic cylinder at one side of the clamp 28 to facilitate raising and lowering the sleeve members 27 relative to the cylinders 22. The pin 32 is adapted to rest in one or another of the notches 33 in a slide sleeve 34 on the sleeve member 27, these notches being in communication with a vertical slot 35 formed in the slide sleeve 34.

One end of the cross shaft 24 has a pinion gear 36 secured thereto engaging a rack bar 37 the lower end of which is connected to the end of the piston rod 38 of an hydraulic ram 39 the cylinder 40 of which is firmly secured to one of the side legs 26. The arrangement is such that upon admission of fluid under pressure into the cylinders 22, by means of a suitable control valve of well known design the platform 17 will be moved up toward the cross bar 29 to clampingly secure the can disposed between them.

The cylinders 22 and 40 are connected in an hydraulic system in a conventional manner such that upon manual operation of a control valve in the system, hydraulic fluid first flows into the pistons 22 to elevate the platform 17 with a full can thereon. The full can is thus raised vertically as the rods 21 are forced upwardly relative to the cylinders 22 until the upper rim of the can on the platform engages the crossbar 29. The cam is now clamped securely between the platform 17 and crossbar 29 and since pressure of fluid within the cylinders 22 pass a certain degree the fluid is bypassed into the cylinder 40 of the hydraulic ram 39 to raise the rack bar 37. Thus the pinion gear 36 is turned anticlockwise (FIGS. 1 and 6) to turn the cross-shaft 24 and with it the cross sleeve 23 and the entire platform with the full can clamped thereon.

The full can is thus inverted from the lower quadrant of a circular path about the axis of the cross-shaft 24 to an upper quadrant of such path on the opposite side of the cross-shaft. The weight of the can is now on the crossbar 29 of the can clamp 28 until a relief valve in the hydraulic system is engaged whereby the flow of hydraulic fluid in the system is reversed to release the can and return the platform 17 to can receiving position.

Conveyor

The conveyor 12 has a receiving end 45 inclined toward the can dumper 11 for receiving inverted cans therefrom. The receiving end 45 of the conveyor 12 has transverse rollers 46 over which the inverted cans gravitate toward the steam chamber 15. These rollers 46 are spaced sufficiently from each other to allow some of the contents of the can to drop through to the screw feed 13.

The cans rolling down the inclined receiving end 45 enter the steam chamber 15 through a canvas flap 47 draped at the entrance end of the steam chamber. The inverted can is thus deposited upon the conveyor 12 for movement through the chamber.

The conveyor 12 may be of any well known form including a chain 48 trained around sprockets driven by a source of motive power such as an electric motor. The chain 48 has its upper reach supported in a suitable guide channel 49 and a series of can engaging flights 50 mounted in spaced relation on the chain 48 served to engage and move a can along the conveyor 12 in the usual manner.

The most simple form of such conveyor is shown at 12' in FIG. 2A of the drawing wherein the chain 48 has a single upper reach guided in a single channel 49 located centrally of the chamber 15. At each side of the channel 49 is a steam pipe 51 spaced from each other such as to support an inverted can. These steam pipes 51 have apertures formed therethrough exposed to the inverted cans such as to discharge jets of steam under pressure up into the inverted cans as they move along through the chamber 15.

The flights 50 on the chain 48 extend upward such that as an inverted can rolling down the inclined receiving end 45 of the conveyor enters the chamber 15, a flight 50 will engage the leading end of the can and move it along with the chain 48.

In FIGS. 1, 2 and 3 through 5 the conveyor 12 is shown to consist of three chains 48 each in a separate channel 49 and so arranged within the chamber 15 as to support the inverted cans in a tilted condition. In this arrangement one chain and channel member 52 is disposed to be engaged by the open bottom end of the cans while the other two chain and channel members are disposed to tangentially engage the side of such cans in a plane perpendicular to that in which the chain and channel member 52 engage and support such can. The angle between these two sets of can supports is offset relative to vertical and horizontal so that a can resting open end on the member 52 leans toward the other two chain and channel members.

In connection with this latter form of conveyor 12 the discharge end of the receiving portion 45 of the conveyor is twisted in such a manner as to tilt the inverted cans just as they are about to gravitate onto the tilt-type conveyor 12.

As stated above steam under pressure is injected into the open lower end of each can. This is also true in the case of the tilt type conveyor 12 in which a steam pipe 54 beneath the channel of the member 52 has lateral jets 55 spaced along its length each with an upturned discharge nozzle 56 which ejects steam under pressure into the open end of a can to scald and cleanse the same.

In addition to the foregoing steam pipes 51 and 54, auxiliary steam pipes 57 are associated with the channel of each of the chain and channel members. Steam coursing through these auxiliary steam lines 57 serves to heat up the interior of the chamber 15 to thereby melt or soften the greases and fats adhering to the interior of the cans.

As the can moves through the steam chamber 15 and the grease adhering to the inner wall of the cans is melted the jets of steam impinging upon the inner wall of the cans remove the grease therefrom. By the time the can has traveled the length of the chamber 15 all the grease is removed from the cans as they discharge onto the terminal end 58 of the conveyor for passage onto further conveyors where they dry out.

The contents of each can gravitating into the screw conveyor 13 is also heated so that the greases and water separates from solid chunks of meat and bones. To accomplish such supplemental heating, steam lines 59 embracing the trough 60 in which the screw feed 13 turns, run parallel thereto and maintain the walls of the trough in a heated condition to keep the greases in a fluid state. The water and the grease in a fluid state drains through the screen 14 formed by perforations in the bottom of a trough 60 in which the screw feed turns. A second trough or sump 61 is formed beneath the trough 60 to catch the fluid draining through the screen 14.

Figure 4:
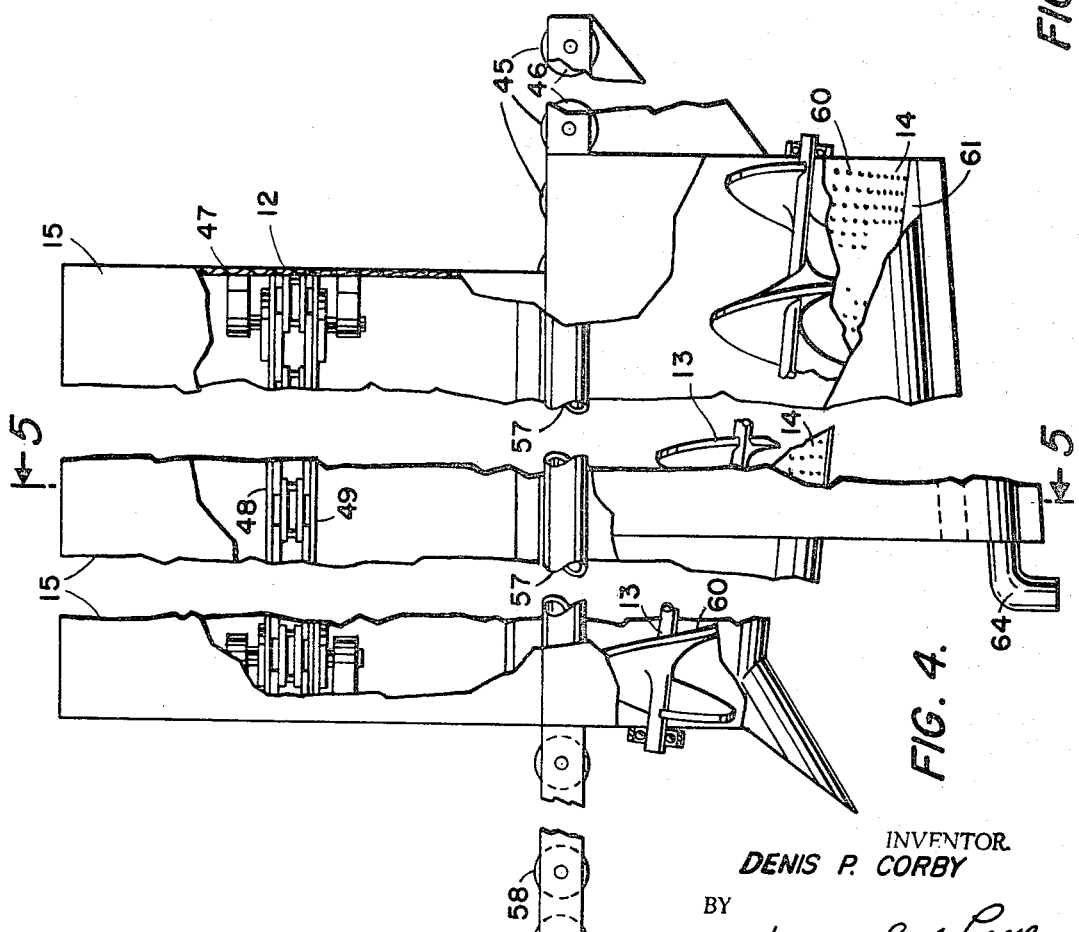
FIG. 4 is an elevation similar to that of FIG. 1 but enlarged and further foreshortened to better illustrate the ends and central zone of the apparatus.

As best seen in FIGS. 1 and 4 the screw feed 13 and sump trough 61 diverge relative to each other, the screw feed trough 60 being inclined to drive solids upwardly while the sump trough declines therefrom so that the flowable greases and fluid gravitate toward a discharge end 62 (FIG. 4). By this arrangement all of the solids such as meat, chunks, skin and bones and the like are moved by the screw feed 13 to a point of discharge for conveyance by other means to a grinder or cooker for processing. The greases and fluids are captured in any form of receptacle for further separation and processing.

The foregoing apparatus provides an automatic means for handling meat scrap collecting cans in such a manner that from the unloading of such cans at the treatment plant to the point of empty clean cans for redistribution to restaurants and butcher shops, no manual labor is required. The cans are completely degreased and cleaned and ready for reuse without the need for further scalding and cleaning.

While I have described the apparatus for removing grease from cans and drums in specific detail it will be appreciated by those skilled in the art that variations, alterations and/or modifications may be made without departing from the spirit or scope of my invention therein. I therefore desire to avail myself of all variations, alterations and/or modifications that may fairly come within the purview of the appended claims.

1. Apparatus for removing grease from cans, drums and the like comprising in combination:
   (a) a can receiving dumper,
   (b) a conveyor for receiving cans in inverted condition from said dumper and for conveying them along a predetermined path,
   (c) a steam chamber surrounding said conveyor for heating the cans as they are conveyed along said predetermined path,
   (d) steam jets disposed in said chamber for ejecting jets of steam into the inverted cans for impingement against the inner walls thereof for removing grease therefrom, and
   (e) means below said conveyor for receiving the contents of such cans comprising
      a screw feed including a trough having a perforated bottom for moving solids to a point of discharge, and
      a sump trough below the perforated bottom of said screw feed for receiving grease and fluids therefrom.

2. The device in accordance with claim 1 in which said sump trough pitches downwardly for directing grease and fluid to a point of collection remote from the point of discharge of said screw feed.

3. The device in accordance with claim 2 in which said screw feed is inclined upwardly and said sump trough pitches divergingly downwardly therefrom for directing grease and fluid to a point of collection remote from the point of discharge of said screw feed.

4. Apparatus for removing grease from cans, drums and the like comprising in combination:
   (I) a can receiving dumper comprising (a) a platform including a frame having a plurality of rollers for receiving a can,
(b) a pair of hydraulic rams at the end of said frame adjacent opposite sides thereof for raising said platform,
(c) a cross shaft for pivotally mounting said rams for turning movement about an axis above said end of said frame,
(d) a can clamp comprising a cross bar mounted on said hydraulic rams above said platform and engageable by a cam thereon when said platform is raised by said rams,
(e) a pinion gear on said cross shaft,
(f) a rack bar in mesh with said pinion gear, and
(g) an hydraulic ram having an hydraulic cylinder secured to said rack bar for moving the latter to turn said platform and can clamp with a can engaged therebetween for deposit in inverted condition upon a conveyor,
(II) a conveyor for receiving cans in inverted condition from said dumper and for conveying them along a predetermined path,
(III) a steam chamber surrounding said conveyor for heating the cans as they are conveyed along said predetermined path,
(IV) steam jets disposed in said chamber for ejecting jets of steam into the inverted cans for impingement against the inner walls thereof for removing grease therefrom, and
(V) means below said conveyor for receiving the contents of such cans.

5. The device in accordance with claim 4 in which said can clamp comprises:
(a) a pair of sleeves mounted for up and down movement on said pair of hydraulic rams,
(b) a cross bar secured to said sleeves above said platform for engaging the upper rim of a can thereon,
(c) pin means between one of said sleeves and the ram it is mounted on for securing said sleeves and the cross bar carried thereby in spaced relation to said platform to admit a can therebetween, and
(d) means for admitting fluid under pressure into said rams for elevating said platform toward said cross bar for clampingly securing a can therebetween.

6. The device in accordance with claim 5 in which said means for receiving the contents of such cans comprises:
(a) a screw feed including a trough having a perforated bottom for moving solids to a point of discharge, and
(b) a sump trough below the perforated bottom of said screw feed for receiving grease and fluids therefrom.

7. The device in accordance with claim 6 in which said sump trough pitches downwardly for directing grease and fluid to a point of collection remote from the point of discharge of said screw feed.

8. The device in accordance with claim 7 in which said screw feed is inclined upwardly toward its discharge end and said sump trough pitches divergingly downwardly relative to said screw feed for directing grease and fluid to a point of collection remote from the point of discharge of said screw feed.

References Cited

UNITED STATES PATENTS

| | | | |
|---|---|---|---|
| 363,826 | 5/1887 | Hinsdale | 210—152 |
| 949,121 | 2/1910 | Hood | 134—62 X |
| 1,583,034 | 5/1926 | Valerius et al. | 134—68 |
| 1,652,654 | 12/1927 | Wolfinger et al. | 134—62 X |
| 2,021,122 | 11/1935 | Fowler | 210—152 X |
| 2,698,624 | 1/1955 | Peters | 134—62 |
| 2,894,516 | 7/1959 | Froehlich | 134—62 |

REUBEN FRIEDMAN, *Primary Examiner.*

J. ADEE, *Assistant Examiner.*

U.S. Cl. X.R.

210—177, 248, 414; 134—62